(12) United States Patent
Schwindt

(10) Patent No.: US 7,854,287 B2
(45) Date of Patent: Dec. 21, 2010

(54) MOTORCYCLE AIR SUSPENSION SYSTEM

(76) Inventor: Jeffrey R. Schwindt, 6359 Brokenhurst Rd., Indianapolis, IN (US) 46220

( * ) Notice: Subject to any disclaimer, the term of this patent is extended or adjusted under 35 U.S.C. 154(b) by 0 days.

(21) Appl. No.: 12/502,205

(22) Filed: Jul. 13, 2009

(65) Prior Publication Data

US 2010/0025945 A1    Feb. 4, 2010

Related U.S. Application Data

(63) Continuation of application No. 11/423,229, filed on Jun. 9, 2006, now Pat. No. 7,559,396.

(60) Provisional application No. 60/689,454, filed on Jun. 10, 2005.

(51) Int. Cl.
*B62D 61/02* (2006.01)

(52) U.S. Cl. ............... 180/227; 180/219; 280/284; 188/303

(58) Field of Classification Search ........... 180/227; 280/275, 284; 188/302–304; 267/64.11, 267/64.15
See application file for complete search history.

(56) References Cited

U.S. PATENT DOCUMENTS

| 1,482,280 | A | * | 1/1924 | Wheeler | 188/303 |
|---|---|---|---|---|---|
| 6,003,628 | A | * | 12/1999 | Jurrens et al. | 180/227 |
| 6,105,988 | A | * | 8/2000 | Turner et al. | 280/276 |
| 6,193,005 | B1 | * | 2/2001 | Jurrens | 180/227 |
| 6,533,305 | B1 | * | 3/2003 | Falk | 280/276 |
| 6,688,626 | B2 | * | 2/2004 | Felsl et al. | 280/275 |
| 6,871,718 | B2 | * | 3/2005 | McGuire, Larry L. | 180/210 |
| 7,131,511 | B2 | * | 11/2006 | Arnold | 180/227 |
| 2003/0141678 | A1 | * | 7/2003 | McGuire | 280/5.515 |
| 2003/0193164 | A1 | * | 10/2003 | Parigian | 280/284 |
| 2003/0234144 | A1 | * | 12/2003 | Fox | 188/278 |
| 2006/0278457 | A1 | * | 12/2006 | Schwindt | 180/227 |
| 2007/0045024 | A1 | * | 3/2007 | Koistra et al. | 180/227 |
| 2008/0067778 | A1 | * | 3/2008 | Schwindt | 280/276 |
| 2008/0231033 | A1 | * | 9/2008 | Brawn | 280/781 |

* cited by examiner

*Primary Examiner*—Lesley Morris
*Assistant Examiner*—Tashiana Adams

(57) ABSTRACT

A suspension system for use with a motorcycle includes a device for producing a supply of pressurized air. The suspension system is operably disposed between a frame member and a swing arm of the motorcycle. The suspension system comprises a double-acting pneumatic cylinder.

27 Claims, 7 Drawing Sheets

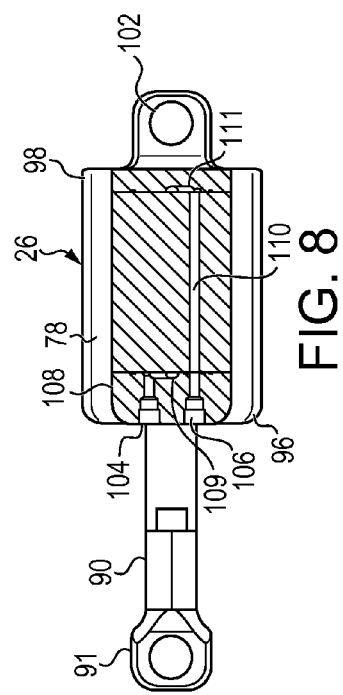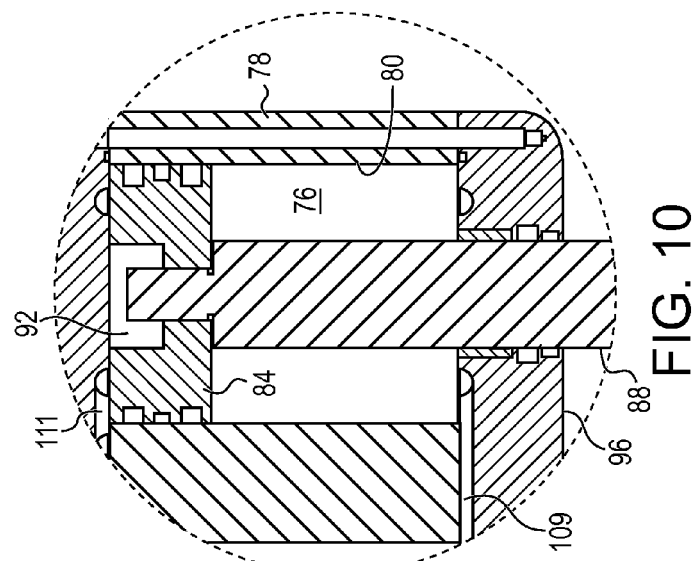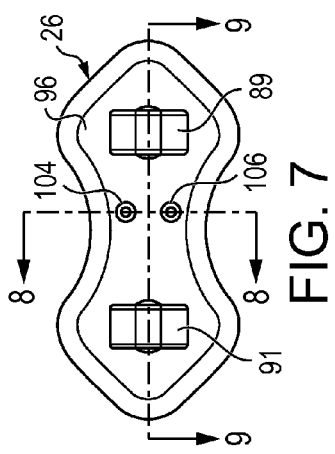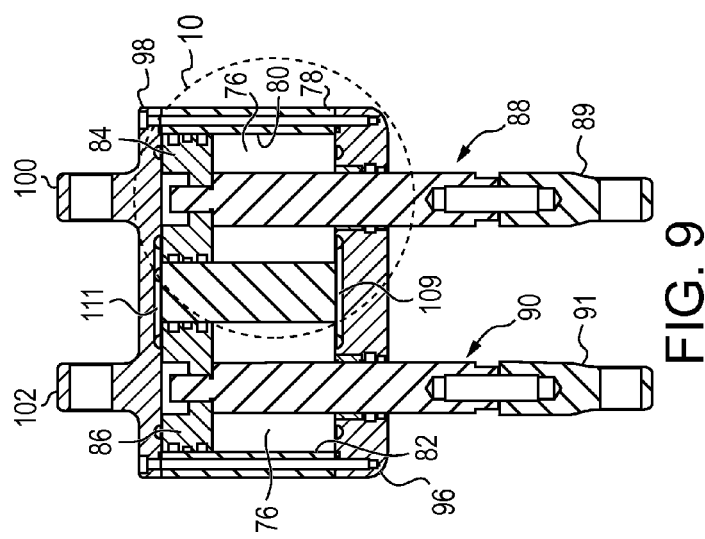

MOTORCYCLE AIR SUSPENSION SYSTEM

This application is a continuation of U.S. patent application Ser. No. 11/423,229, filed Jun. 9, 2006 now U.S. Pat. No. 7,559,396, which claims priority under 35 U.S.C. §119(e) to U.S. Provisional Application Ser. No. 60/689,454, filed Jun. 10, 2005, which is expressly incorporated by reference herein.

FIELD OF THE INVENTION

This invention generally relates to vehicle suspension systems. More particularly, in an illustrated embodiment, the invention is directed to air suspension systems for motorcycle suspensions.

BACKGROUND OF THE INVENTION

In general terms, motorcycles typically include a main frame to which the engine is attached. One or more sub-frames or like elements can be movably attached to the main frame, each of which can be adapted to hold one of the motorcycle wheels. The moving sub-frames may permit the motorcycle front and rear wheels to move relative to the main frame. A suspension system may also be used to maintain the height of the motorcycle.

Traditionally, motorcycle suspension systems for street bikes have included one or more springs (typically coil springs) and a hydraulic damper unit applied to each of the front and rear wheel to provide the lift and dampening needed to suspend the vehicle and control movement of the wheels during compression and rebound of the wheels. Such a spring and damper unit may be fastened between a swing arm and main frame in the rear of the motorcycle to control the rear wheel assembly and associated parts. Also, a spring and damper unit may be positioned inside a telescoping fork assembly to control the front wheel. Another form of a front fork, referred to as a "springer" fork, includes a spring suspension operating between two pairs of parallel fork members in a well known manner.

Other suspension systems may use air in place of or in addition to the spring. These systems are often called air-ride suspension systems, and may use rubber air bags as springs and may further be charged using a compressed air system. Compressed air may be varied to control the ride height and the ride characteristics (i.e. firmness) of the motorcycle. However, the ride will inherently get firmer as the air pressure increases in these systems.

SUMMARY OF THE INVENTION

The present invention relates to a suspension system having double-acting air cylinders. In one illustrative embodiment, a control mechanism allows the ride height to be adjusted independently of the ride firmness. In such an embodiment, the operator may set the firmness of the system and ride quality via two adjustments. A first adjustment, via a main regulator, can address the weight of the motorcycle, rider(s) and load. A second adjustment, via a bias regulator, can provide the rebound control. The system is charged via an air compressor and may be applied to either or both of the rear and front motorcycle suspension.

The present invention may also use a biasing pilot-operated high-relief regulator. Such a bias regulator could automatically respond to, proportionally, the main regulator (pressure) setting; therefore, once the system is calibrated, only one adjustment is necessary. The bias regulator controls the dampening of the suspension action.

In another embodiment, the bias of the double-acting air cylinder is not adjustable, but rather is set to a pre-selected pressure, or is configured to utilize ambient air pressure.

Due to the compact size of the cylinders described herein, longer suspension strokes or travel is possible and allows travel of the full stroke of the suspension. The system also allows the motorcycle frame to be lowered to the ground.

Further, the system disclosed herein could be applied to other vehicles or suspension systems, such as those found in autos and trailers. Accordingly, as referred to herein, the term "motorcycle" and the like may be substituted by "vehicle", "auto", "trailer", or any other use that could incorporate the suspension system disclosed herein. Further features and advantages of the invention will be readily apparent from the specification and from the drawings.

BRIEF DESCRIPTION OF THE DRAWINGS

FIG. 7 shows an end view of the double-acting cylinder of FIG. 4;

FIG. 8 shows a cross sectional view through lines 8-8 of FIG. 7;

FIG. 9 shows a cross sectional view through lines 9-9 of FIG. 7;

FIG. 10 shows a detail cross sectional view of area 10 of FIG. 9;

DETAILED DESCRIPTION OF THE INVENTION

Figure 1:
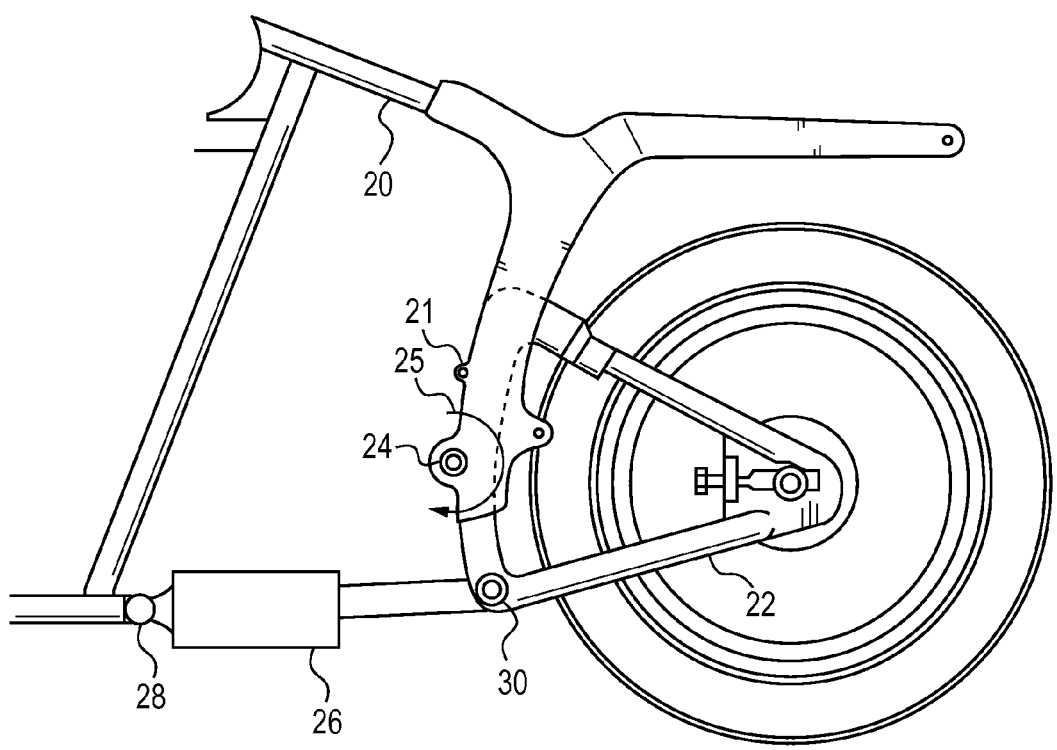
FIG. 1 shows a partial motorcycle frame and swing arm assembly including an air suspension device according to one embodiment of the invention.

FIG. 1 illustrates a well-known frame 20 and swing arm 22 arrangement referred to as a SOFTTAIL® for a motorcycle. This type of frame and swing arm functions in a well known manner and a number of suspension systems have been proposed, designed and marketed which provide suspension functions to such a frame. Generally, the frame 20 includes a pivoting swing arm or sub-frame 22, which moves in an arcuate fashion relative to main frame 20 about pivot 24. A suspension component 26 is pivotably attached between a lower and rearward portion (i.e. a strut) 28 of the main frame 20 and a lower and forward portion 30 of the rear wheel sub-frame 22. The suspension component 26 of the present invention is described in more detail below.

In the illustrated embodiment, suspension component 26 is connected and operates between main frame 20 and swing arm 22 and includes a double-acting air cylinder in communication with a system 50. A rear-wheel embodiment of the system 50 is shown diagrammatically in FIG. 2, and a frontand-rear-wheel embodiment is shown in FIG. 3. A battery 52 provides electrical energy to electrical components of the system. The battery 52 may be the same battery that the motorcycle uses for ignition, illumination and other electrical functions.

In one embodiment, a relay 54 is connected to the battery 52. Closing the relay 54 permits electricity from the battery 52 to operate an air motor or compressor 56. In one embodiment, the relay 54 is in the same circuit as ignition switch 62; therefore, closing the switch closes the relay 54 and permits operation of the compressor 56. In operation, compressor 56 supplies high-pressure air to an air tank 58 through a filter 60. The filter 60 is provided to filter impurities, such as particulate matter and oil.

A pressure switch 64 monitors the pressure in tank 58. The tank 58 may be a separate tank or may be part of the frame, such that a frame member may be used to contain pressurized air from the compressor 56. If the pressure is less than a predetermined amount, e.g. 150 pounds per square inch (psi), the pressure switch 64 is closed, thereby energizing relay 54. The switch 64 may therefore be configured to cause actuation of the compressor 56 when the pressure drops a certain amount below the predetermined desirable pressure. For example, switch 64 may be triggered at 12 psi below (i.e. 138 psi) the illustrative predetermined 150 psi.

Illustratively, valve 66 is a solenoid interlock valve (i.e. a Clippard EE3TO-12 valve) that is connected to the ignition switch 62. When ignition 62 is in the "off" position, valve 66 will not permit passage of pressurized air from the tank 58. This prevents damage that can be done to the motorcycle by a bystander when the motorcycle is parked. Further, in the illustrative embodiment, turning switch 62 to the "lights on" position will permit compressor 56 to operate.

Toggle valve 68 is illustratively a manual air valve positioned downstream from solenoid valve 66. When opened, toggle valve 68 permits full activation of the system 50. If the system 50 is pressurized and the motorcycle ignition is on, the valve 68 may be opened by a motorcycle operator permitting pressurized air to pass through the valve 68.

In the illustrated embodiment, pressurized air passing through the opened toggle valve 68 passes to the primary regulator 70. The primary regulator 70, which is illustratively a relieving regulator, is used to produce the desired amount of output pressure. The desired amount of pressure may be pre-set by the motorcycle manufacturer or technician, but may also be altered by the vehicle operator, who may select the amount of pressure delivered to suspension component 26 by changing the setting of primary regulator 70.

In one illustrated embodiment, air generated by primary regulator 70 passes at the selected pressure through a one-way check valve 72, which is illustratively a spring biased valve and valve seat. A pressure relief valve 74 (or pressure dump valve) is coupled to the circuit between check valve 72 and wheel-side chamber 76 of the suspension component 26. Pressure relief valve 74 is a manually operated valve which permits the pressurized air to be vented from within the wheel-side chamber 76, an option that may be initiated by an operator wanting a lower ride height.

The suspension component 26, which is illustratively a double-acting cylinder and piston arrangement, includes a housing 78 capable of holding pressurized air. The illustrated housing defines a pair of parallel air cylinders 80, 82. The use of parallel air cylinders such as those described provides the advantage of greater resistance over a smaller stroke range. Disposed within the air cylinders 80, 82 are a respective pair of pistons 84, 86, which are sealed in the cylinders so as to prevent loss of air pressure. Such pistons are positioned to reciprocate within the cylinder bores. Each piston 84, 86 includes a connecting rod 88, 90 for connecting the pistons to the swing arm 22 at point 30. When pressurized air enters wheel-side chamber 76, the pistons 84, 86, are forced farther into the cylinders 80, 82, which causes the suspension component 26 to shorten.

Looking at FIG. 1, one can see that by pressurizing chamber 76 and thereby shortening suspension component 26, sub-frame 22 will pivot about pivot axis 24 in a direction indicated by arrow 25, and the motorcycle frame 20 will resultingly lift in a vertical direction. In the illustrated embodiment, the sub-frame 22 and frame 20 can be configured to move between a position that places the frame directly on the ground and a position that raises frame 20 several inches off the ground. In the raised position, the motorcycle may be ridden. The lowered position may provide a resting or parked configuration for the motorcycle. Positions in between offer other low-profile riding options.

The pressurized air in chamber 76 provides the spring rate of the system 50 and thus, the compression characteristics of the suspension and the ride height of the motorcycle.

Figure 2:
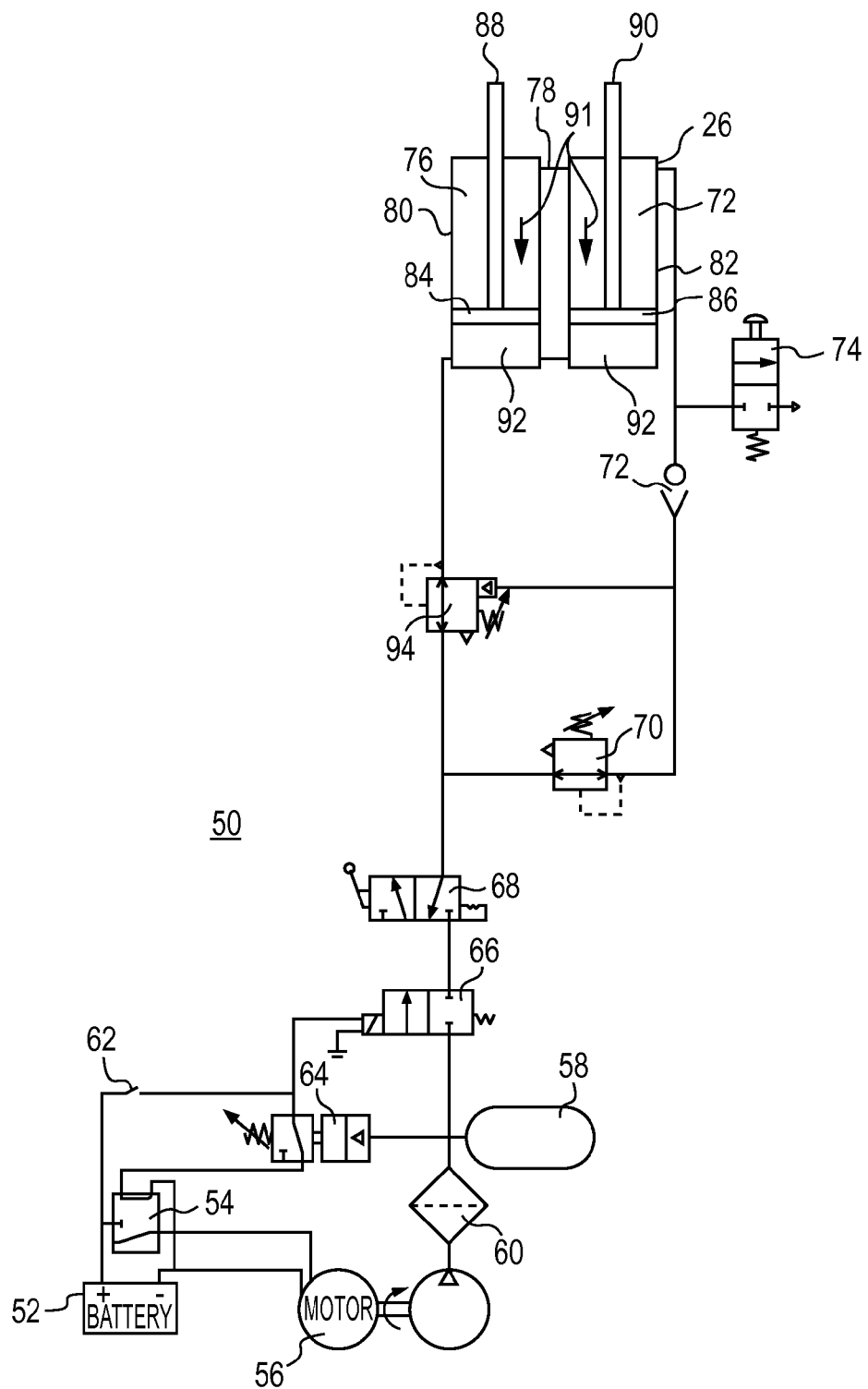
FIG. 2 shows a diagram of an air suspension system according to one embodiment of the invention.
Figure 3:
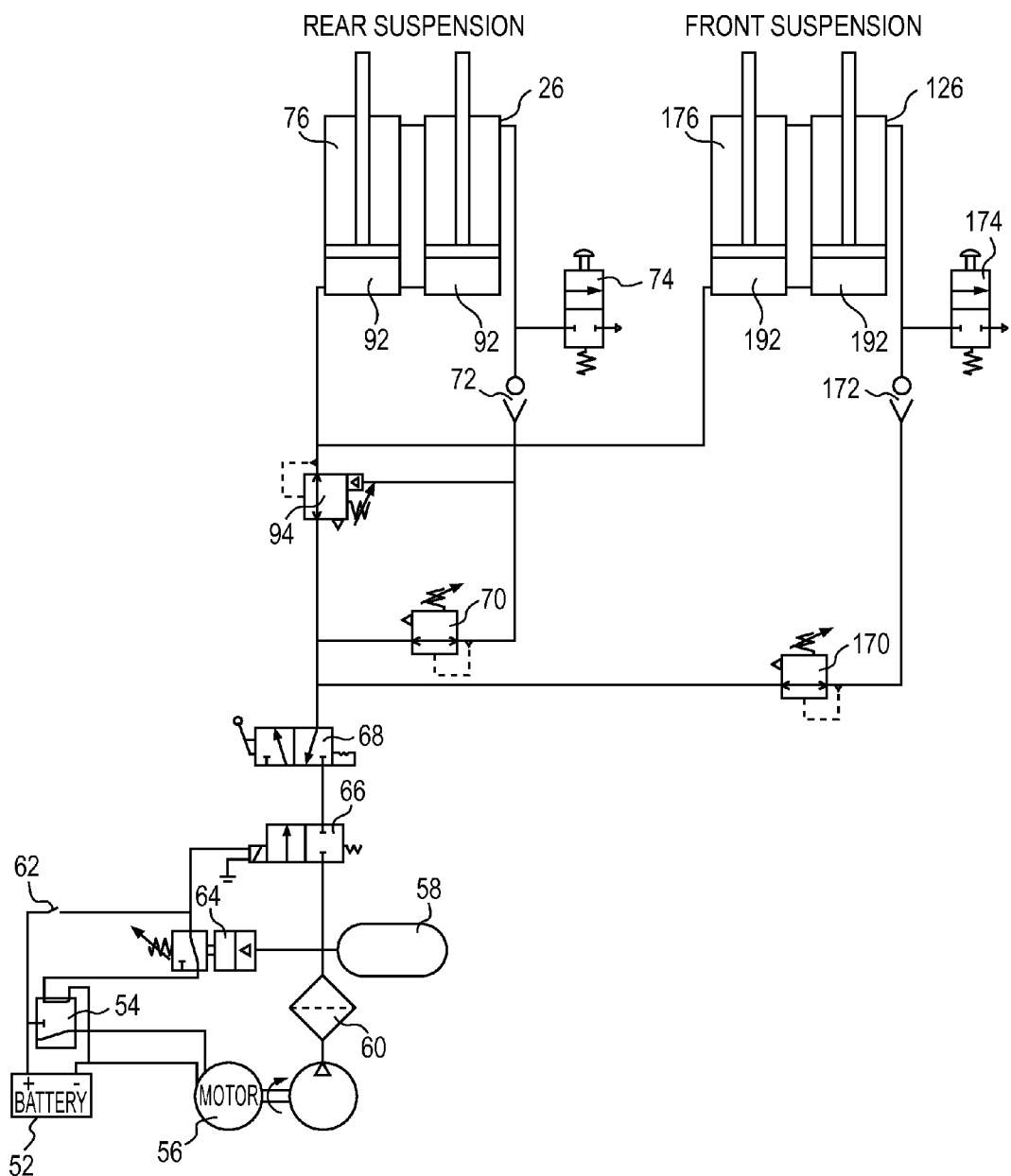
FIG. 3 shows a diagram of an air suspension system according to a second embodiment of the invention.
Figure 6:
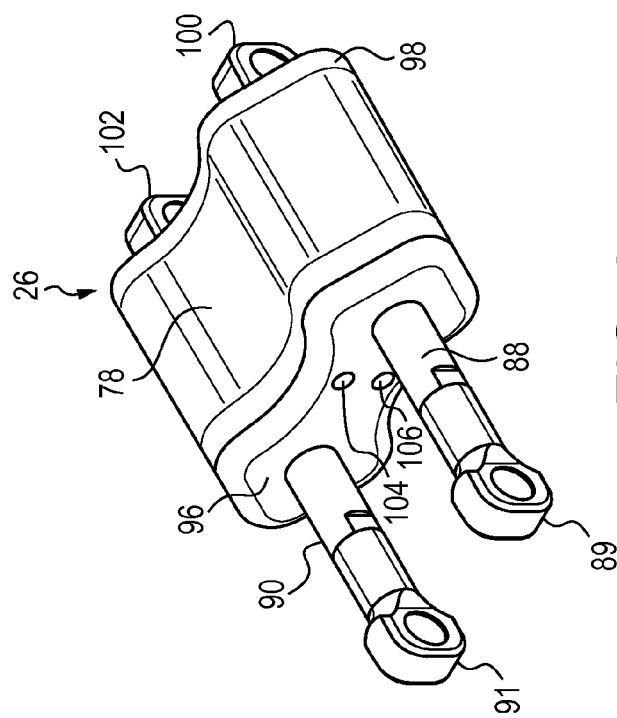
FIG. 6 shows a perspective view of the double-acting cylinder of FIG. 4.
Figure 5:
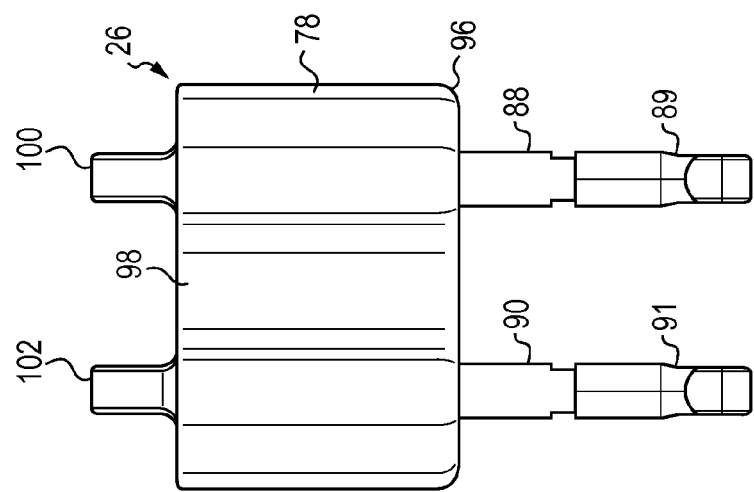
FIG. 5 shows a top view of the double-acting cylinder of FIG. 4.
Figure 4:
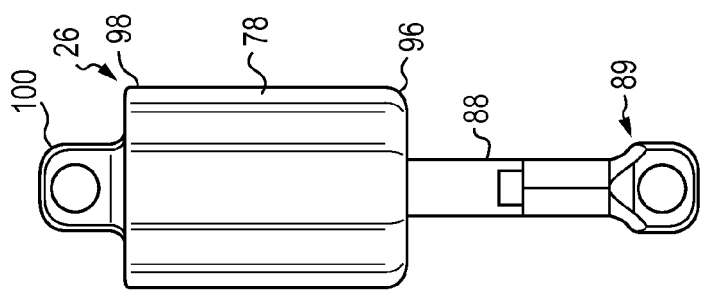
FIG. 4 shows a side view of a double-acting cylinder portion of the invention.

As can be seen in FIG. 2, housing 78 cooperates with pistons 84, 86 to define a second set of chambers, i.e., frame-side chambers 92. In the illustrated embodiment, frame-side chambers 92 are at ambient pressure when the system is inactivated. However, when the system is activated, increased pressure in chambers 76 causes pistons 84, 86 to move in a direction indicated by arrows 91, thereby compressing the air in frame-side chambers 92.

In the embodiment illustrated in FIG. 2, pressurized air is supplied to the frame-side chambers 92 at a secondary pressure to offset the primary pressure in chambers 76. Such a secondary air pressure is generated by a biasing regulator 94. One example of a biasing regulator 94 is a Type 200 Precision Air Relay manufactured by ControlAir Inc.; more information can be obtained at www.controlair.com. The biasing regulator 94 is supplied with pressurized air from the toggle switch 68 and may be preset by the system manufacturer, motorcycle manufacturer or in the alternative, adjusted for ride characteristics by the operator.

In the embodiment illustrated in FIG. 2, the secondary pressure output by biasing regulator 94 is generated as a ratio of or is proportional to the pressure from the primary regulator 70. As can be seen in FIG. 2, compressed air from primary regulator 70 is fed to biasing regulator 94, and biasing regulator 94 is configured to deliver the secondary pressure at a pressure relative to that of the input pressure from primary regulator 70. Air supplied from the biasing regulator 94 is delivered to the frame-side chamber 92 of suspension component 26 in part to offset the pressure in the wheel-side chamber. Such compressed air from the biasing regulator 94 controls the rebound of the suspension component, and of the motorcycle as a whole.

As is further illustrated in FIG. 2, biasing regulator 94 provides a counterbalance to the air spring effect on an opposite side of the piston as that of the main air suspension pressure. The biasing regulator maintains a ratio or proportional counterforce to the air spring unloaded setting, and thus, provides the rebound control in a manner which tracks any changes in the main air spring pressure. Air functions as an ideal spring due to the fact that the spring rate is progressive during compression in contrast to most springs, which have a linear fixed compression rate.

FIG. 3 shows another embodiment, wherein an additional set of regulator, valve and suspension elements is provided to a front end of a motorcycle. As illustrated, a second air line downstream from toggle valve 68 feeds a second primary regulator 170. Pressurized air regulated by second primary regulator 170 passes through one-way valve 172 and enters main chamber 176 of suspension unit 126. The secondary air supply is supplied by bias regulator 94 to secondary bias air chambers 192 to offset the air pressure in primary chambers 176. A venting pressure relief valve 174 is coupled to the circuit between the check valve 172 and main chamber 176. Such a pressure relief valve can relieve air pressure from chamber 176 in a fashion similar to that described above for pressure relief valve 74.

The device 126 used in the front suspension (such as a springer fork) may be a rotary actuator, or any type of double-acting cylinder. However, the invention contemplates any pneumatic device capable of providing the function of a double-acting cylinder/piston device, as shown in the figures and discussed in detail below.

Referring to FIGS. 2 and 3, one embodiment of a method of setting up and/or operating the system 50 includes turning on the system via toggle switch 68, which charges the cylinders 76, 92 (and alternately 176 and 192). When the flow is increased in primary regulator 70, an increased air pressure is delivered to components 26, 126 until the motorcycle rises. This setting also controls the firmness of the suspension. Then, bias regulator 94 is adjusted to set the dampening of the system. If at a later point, the primary regulator flow is adjusted, such as to lower the ride height, the bias regulator 94 will automatically follow the adjustment to the primary regulator. The bias regulator 94 can also be adjusted to change or modify the rebound effect.

While the rider is on the motorcycle, the motorcycle ride height can be reduced or lowered by pressing pressure relief valve(s) 74, 174. The ride height will remain at this new changed setting until the rider gets off the motorcycle.

In the embodiment illustrated in FIG. 2, system 50 has a "memory" of the desired ride height. A rider will often desire to lower the height of his/her motorcycle, i.e. while riding the motorcycle and desiring a lower profile, or when the motorcycle is parked and it is desired to lower the frame to the ground. When the ignition key is later turned to the "on" position, compressed air that is stored in either an external tank or in tank 58 is delivered to system 50, and the ride firmness or quality that was previously set by the rider is recovered. In the alternative, the rider can adjust the primary regulator 70 to a new setting, resulting in a new ride firmness.

One advantage of the present invention is the ability of suspension component 26 to have a greater stroke length, extending beyond two inches and to as much as 2.5 inches. This allows for greater fluctuation in the height of the rear of the motorcycle, and permits a greater range of use for the suspension component.

As a safety feature, as can be seen in FIG. 1, a stop 21 is illustratively added to prevent the accidental lowering of the motorcycle ride height to an unsafe level during operation. Such a stop 21 can be as simple as a pin inserted through an aperture in frame 20, the pin blocking further pivoting movement of sub-frame 22. The pin could be spring-loaded so that it automatically moves into the locking position once the motorcycle is raised above the lowest, parked height.

FIGS. 4-7 show various views of the exterior of suspension component 26. The suspension component 26 illustratively comprises a single housing 78 having parallel rods 88, 90 disposed therein. Rods 88, 90 are connected inside the housing 78 to pistons (84 and 86 in FIGS. 2 and 9). Rods 88, 90 connect to the swing arm 22 at point 30 (shown in FIG. 1). As can be seen in FIGS. 7-10, housing 78 is closed at one end by main chamber cap 96 which closes off wheel-side chambers 76. Housing 78 is closed at an opposite end by secondary chamber cap 98 (shown in FIGS. 8 and 9), which closes off the secondary or bias chambers 92 (shown in FIG. 2). The secondary chamber cap 98 includes a pair of extensions 100, 102 for connecting the unit 26 to the frame 20 at point 28 (of FIG. 1). A first air fitting 104 is provided for attaching an air line to cap 96 for supplying main air supply to wheel-side chambers 76 (of FIG. 2). The cross-sectional view of suspension component 26 in FIG. 8 shows a primary air bore 108 formed in cap 96 for supplying the compressed air from primary regulator 70 that is directed through first fitting 104. Channel 109, shown in FIGS. 8-10, permits distribution and equalization of air pressure between main chambers 76.

In the disclosed embodiment, rod ends 89, 91 of rods 88, 90 (respectively) and extensions 100, 102 include a self-lubricating bearing material that permits extended function. Furthermore, the tolerances for rod ends 89, 91 and extensions 100, 102 are such that the suspension component 26 may be installed on a variety of motorcycles and even on frames having slight offsets or imperfections. For example, in an illustrative embodiment, rod ends 89, 91 and extensions 100, 102 each have a 0.850" width and are configured to ride on a standard 1" wide shoulder bolt. Therefore, the swing arm 22 may be out of alignment with the main frame 20 by as much as 0.300" without having the suspension component affected by the misalignment. Such tolerances permit attachment of the suspension component 26 to varying widths and constructions for motorcycle frames.

A second fitting 106 is also shown in FIG. 8. Second fitting 106 can illustratively be an air fitting for attaching an air line to cap 96, or a check valve (illustrated in FIGS. 11 and 12) that permits the entry of air into chambers 92, but prevents the exit of air from chambers 92, as discussed further herein. Air bore 110 is also provided for delivering air from second fitting 106 to chambers 92.

In the air fitting embodiment (shown schematically in FIG. 2), second fitting 106 provides a port into chambers 92, through which bias air is supplied to bias chambers 92. In such an embodiment, biasing regulator 94 directs compressed air through second fitting 106 and through air bore 110 in order to pressurize chambers 92.

Figure 11:
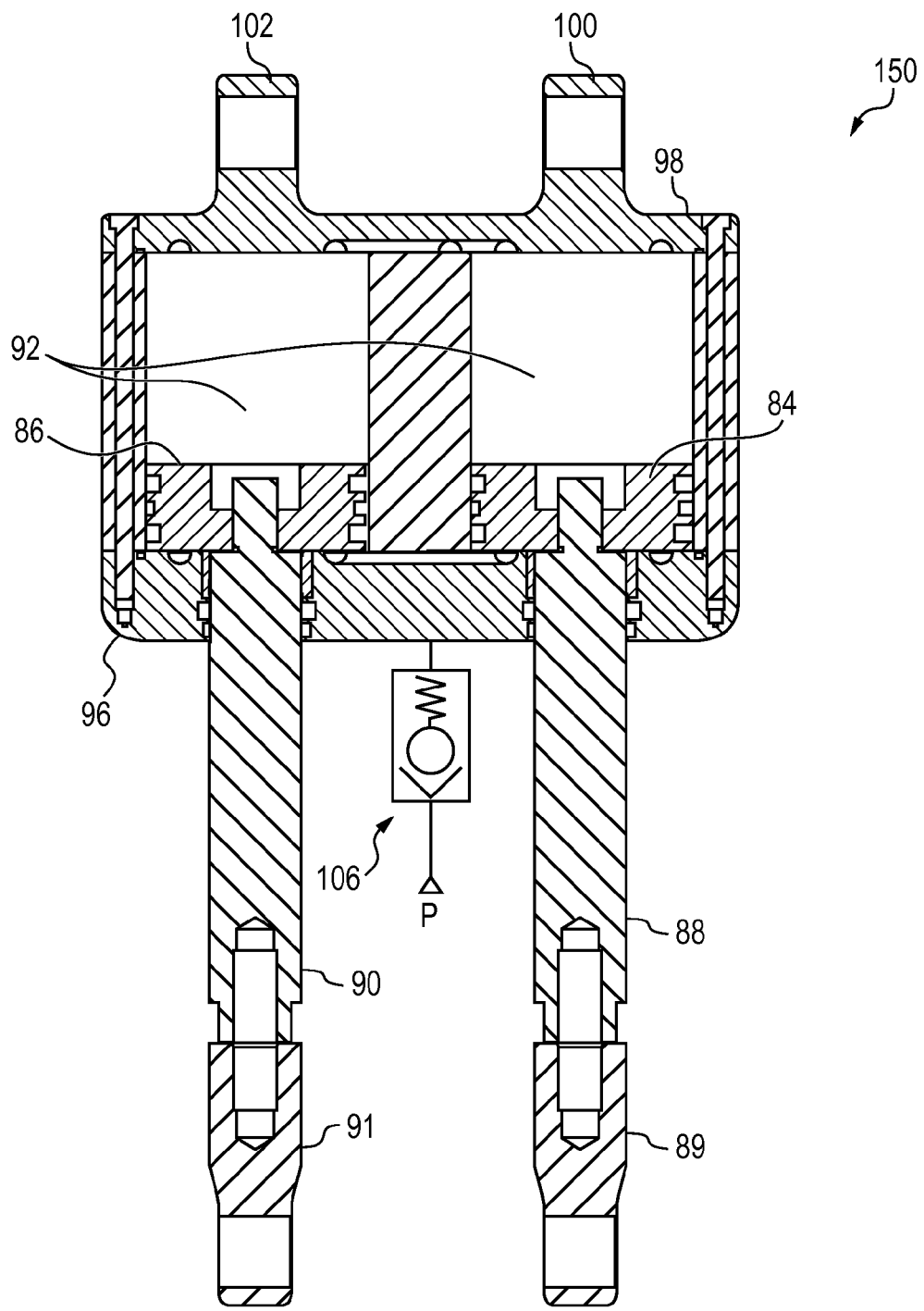
FIG. 11 shows a diagram of an air suspension system according to a third embodiment of the invention, wherein the pistons are in the extended state.
Figure 12:
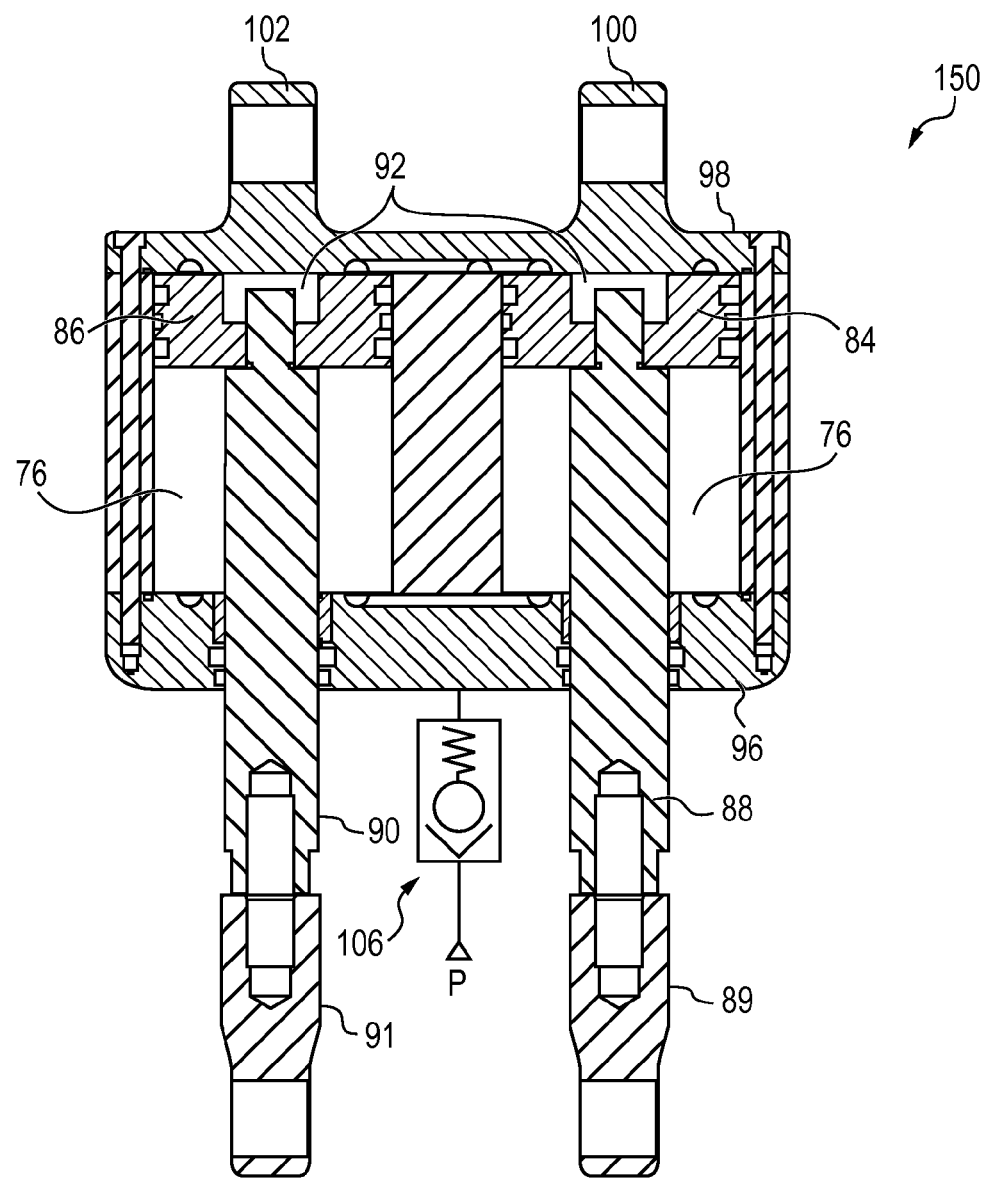
FIG. 12 shows a diagram of the system of FIG. 11, wherein the pistons are in the compressed state.

In the alternative, a check valve system 150, shown in FIGS. 11 and 12, utilizes a second fitting 106 that is a check valve, thereby permitting ambient air to function as the biasing element. In the check valve system 150, as pistons 84, 86 approach the deactivated state shown in FIG. 11, wherein pistons 84, 86 are near or adjacent to chamber cap 96, check valve 106 permits ambient air to enter chambers 92. For example, during the initial installation of the check valve, the initial suspension travel (extension) will suction air through the check valve into chambers 92, and the check valve will seat. This air is now trapped and will act as an air spring.

In such a check valve system 150, a biasing regulator is not needed because the bias results from this trapped (ambient) air. Upon activation of system 150, the trapped air present in chambers 92 is compressed as the pistons 84, 86 move away from chamber cap 96. The opposing air spring force dampens the retract motion of the pistons, thus creating rebound control when the motorcycle suspension encounters bumps. Accordingly, the system is greatly simplified because a simple biasing system is provided without the use of a biasing regulator.

More particularly, when pistons 84, 86 are fully extended in the position shown in FIG. 11, and therefore chambers 92 are at their greatest volume, the pressure in chambers 92 may otherwise be brought below ambient pressure (either due to the fact that it is the initial extension of the pistons, or because some pressure was lost). However, check valve 106 allows air to be pulled inside chambers 92, and eventually used as the "bias" when the system is activated. Upon activation of system 150, compressed air is directed into chambers 76, forcing pistons 84, 86 to move toward chamber cap 98 and meanwhile compress the air in chambers 92. A typical active state for the system may be when the pistons are located somewhere between the positions shown in FIGS. 11 and 12.

In yet another alternative embodiment, chambers 92 may be pre-pressurized to a pre-selected level prior to delivery to the consumer. A desirable pre-selected pressurization level has been determined to be approximately three pounds-per-square-inch (while in the deactivated position shown in FIG. 11), but any pressure above zero psi and below 10 psi is contemplated to be within the scope of the invention.

FIGS. 9 and 10 illustrate that piston 84 is connected to rod 88 and disposed to reciprocate in cylinder bore 80. Likewise, piston 86 is connected to rod 90 and disposed to reciprocate in cylinder bore 82.

Systems 50 and 150 illustratively use small diameter tubing, which act as a flow control and provide some dampening to the system. As disclosed above, the systems 50, 150 may also store compressed air for operation of components in the system. Such stored compressed air would permit the system to be activated as soon as it is turned on.

The system may also have an interlock safety feature to the ignition system, wherein a toggle switch is defeated unless the control system is energized. The system can also return automatically to pre-set pressure settings. Therefore, the operator does not have to adjust the system every time the vehicle is ridden. The system would automatically reset the height when the rider removes his or her body weight from the seat.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the spirit and scope of the disclosure as defined by the appended claims.

What is claimed is:

1. A motorcycle frame comprising
   a main frame
   a swing arm pivotably coupled to the main frame and configured to support a motorcycle wheel thereon, and
   a suspension component coupled to the main frame and the swing arm and configured to affect pivotable movement between the main frame and the swing arm,
   wherein the suspension component comprises a biasing regulator, and wherein the suspension component further comprises a single body pneumatically coupled to the biasing regulator, the single body housing two double-acting pneumatic cylinders therein.

2. The motorcycle frame of claim 1, wherein the double-acting pneumatic cylinders are in pneumatic communication with each other.

3. The motorcycle frame of claim 2, wherein the double-acting pneumatic cylinders communicate via an internal port disposed inside the single body.

4. The motorcycle frame of claim 1, wherein the double-acting pneumatic cylinders are arranged in parallel.

5. The motorcycle frame of claim 1, wherein each double-acting pneumatic cylinder comprises a piston positioned within an elongated cylinder, the piston defining a first chamber at one end of the cylinder and a second chamber at the opposite end of the cylinder.

6. The motorcycle frame of claim 5, wherein the first chamber is in communication with a compressed air source.

7. The motorcycle frame of claim 5, wherein the second chamber is in communication with ambient air.

8. The motorcycle frame of claim 7, further comprising a check valve coupled to the second chamber, the check valve permitting the intake of ambient air into the second chamber.

9. The motorcycle frame of claim 5, wherein the second chamber is pre-pressurized to a predetermined pressure.

10. The motorcycle frame of claim 5, wherein the second chamber is in communication with the biasing regulator.

11. The motorcycle frame of claim 1, wherein the biasing regulator is adjustable by a user.

12. The motorcycle frame of claim 1, wherein the biasing regulator is set at a predetermined position by a manufacturer.

13. The motorcycle frame of claim 1, wherein the biasing regulator maintains the pneumatic pressure of a second chamber as a ratio of the pneumatic pressure of the first chamber.

14. A motorcycle frame comprising
    a main frame
    a swing arm pivotably coupled to the main frame and configured to support a motorcycle wheel thereon, and
    a suspension system configured to trap air in a rebound control chamber and configured to utilize the trapped air in the rebound control chamber to provide suspension rebound control, wherein the suspension system further comprises a housing having two double-acting pneumatic cylinders for affecting movement between the main frame and the swing arm.

15. The motorcycle frame of claim 14, wherein the double-acting pneumatic cylinders are in pneumatic communication with each other.

16. The motorcycle frame of claim 15, wherein the double-acting pneumatic cylinders communicate via an internal port disposed inside the single body.

17. The motorcycle frame of claim 14, wherein the double-acting pneumatic cylinders are arranged in parallel.

18. The motorcycle frame of claim 14, wherein each double-acting pneumatic cylinder comprises a piston positioned within an elongated cylinder, the piston defining a first chamber at one end of the cylinder and a second chamber at the opposite end of the cylinder.

19. The motorcycle frame of claim 18, wherein the first chamber is in communication with a compressed air source.

20. The motorcycle frame of claim 18, wherein the second chamber is in communication with ambient air.

21. The motorcycle frame of claim 20, further comprising a check valve coupled to the second chamber, the check valve permitting the intake of ambient air into the second chamber.

22. The motorcycle frame of claim 20, wherein the second chamber is pre-pressurized to a predetermined pressure.

23. The motorcycle frame of claim 20, wherein the second chamber is in communication with a biasing regulator.

24. The motorcycle frame of claim 23, wherein the biasing regulator maintains the pneumatic pressure of the second chamber as a ratio of the pneumatic pressure of the first chamber.

25. The motorcycle frame of claim 23, wherein the biasing regulator is adjustable.

26. The motorcycle frame of claim 20, wherein the first and second chamber are not in pneumatic communication with each other.

27. The motorcycle frame of claim 14, wherein the suspension system comprises a biasing regulator.

* * * * *